(12) United States Patent
Frost

(10) Patent No.: US 9,417,762 B2
(45) Date of Patent: Aug. 16, 2016

(54) SYSTEM AND METHOD FOR PROVIDING A VIRTUAL IMMERSIVE ENVIRONMENT

(71) Applicant: Northrop Grumman Systems Corporation, Falls Church, VA (US)

(72) Inventor: Ryan C. Frost, Suffolk, VA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 16 days.

(21) Appl. No.: 14/151,381

(22) Filed: Jan. 9, 2014

(65) Prior Publication Data

US 2014/0192087 A1   Jul. 10, 2014

Related U.S. Application Data

(60) Provisional application No. 61/750,516, filed on Jan. 9, 2013.

(51) Int. Cl.
*G06F 3/0481* (2013.01)
*G06F 3/01* (2006.01)
*G06F 3/03* (2006.01)

(52) U.S. Cl.
CPC ............ *G06F 3/04815* (2013.01); *G06F 3/011* (2013.01); *G06F 3/0325* (2013.01)

(58) Field of Classification Search
CPC .......................... G06T 19/006; G06F 3/04815
USPC ....... 345/419, 633; 52/6, 8; 463/34; 359/460; 84/724
See application file for complete search history.

(56) References Cited

U.S. PATENT DOCUMENTS

| | | | | |
|---|---|---|---|---|
| 5,724,775 A | * | 3/1998 | Zobel et al. ........................ 52/6 |
| 2007/0000374 A1 | * | 1/2007 | Clark et al. ..................... 84/724 |
| 2009/0079745 A1 | * | 3/2009 | Fun ..................... G06F 3/04815 345/474 |
| 2010/0277469 A1 | * | 11/2010 | Borrel et al. ................... 345/419 |
| 2010/0300006 A1 | * | 12/2010 | Magpuri ............................. 52/8 |
| 2011/0249330 A1 | * | 10/2011 | Anderson et al. ............. 359/460 |
| 2012/0157204 A1 | * | 6/2012 | Kelsey et al. ................... 463/34 |
| 2012/0229507 A1 | * | 9/2012 | Hayashi .................. A63F 13/06 345/632 |
| 2013/0141428 A1 | * | 6/2013 | Gipson ......................... 345/419 |
| 2013/0167452 A1 | * | 7/2013 | Jacques et al. ..................... 52/8 |

* cited by examiner

*Primary Examiner* — Chante Harrison
(74) *Attorney, Agent, or Firm* — Andrews Kurth LLP; Sean S. Wooden (57) ABSTRACT

A system and method for triggering movement of a user in a virtual immersive environment is disclosed. Embodiments provide evaluation criteria derived from a motion capture system to trigger movement of the user within a virtual world when the user moves, within an actual space of the environment, from a first location within a first zone to a second location within a second zone. The first zone and the second zone are concentric.

21 Claims, 8 Drawing Sheets

SYSTEM AND METHOD FOR PROVIDING A VIRTUAL IMMERSIVE ENVIRONMENT

CROSS REFERENCE TO RELATED APPLICATION(S)

This application claims priority from U.S. Provisional Patent Application. No. 61/750,516, filed on Jan. 9, 2013, which is hereby incorporated herein by reference in its entirety.

BACKGROUND

There are many current virtual immersive environments. Most utilize computer-generated imagery (CGI) technology. Such virtual environments are commonly used at universities for data visualization and analysis, as well as at defense simulation centers for training and rehearsal. Typically, these virtual environments are expensive and have a big overhead of computer equipment necessary to support the environment. Such environments tend to be permanently fixed and non-portable. Additionally, the interface between users and the CGI environment is done through hand-held devices that are not intuitive or accurate.

Training and preparedness rehearsals in realistic environments and conditions are very costly, resource intensive and present potential dangers to those involved. Utilizing simulation and CGI technology to create an immersive environment that replicates those realistic environments is a cost-effective and safe way to train and run through different potential situations. At present, however, virtual environments are very costly and do not integrate the full range of sensory invoking stimulations that one endures in a real world environment.

SUMMARY

Embodiments are directed to a method for triggering movement of a user in a virtual immersive environment. The method comprises determining, using a motion capture system, a first location of the user within an actual space of the environment, wherein the actual space of the environment includes a plurality of concentric zones centered about a center point of the actual space of the environment, the plurality of concentric zones includes a first zone and a second zone, the first zone includes the center point and is defined by an outer boundary, the second zone surrounds the first zone and is defined by an inner boundary and an outer boundary, wherein the outer boundary of the first zone coincides with the inner boundary of the second zone, and wherein the first location is within a first zone. The method also comprises determining, using the motion capture system, a second location of the user within the actual space of the environment, wherein the second location is within the second zone. The method further comprises triggering movement of the user within a virtual world using evaluation criteria derived from the motion capture system when the user moves from the first zone to the second zone.

In an embodiment, movement of the user within the virtual world may not be triggered when the user is located in the first zone, and movement of the user within the virtual world may be at a constant speed when the user is located in the second zone. Movement of the user within the virtual world may be at a constant speed when the user is standing still while located in the second zone.

In an embodiment, the plurality of concentric zones further includes a third zone that surrounds the second zone and is defined by an inner boundary and an outer boundary, wherein the outer boundary of the second zone coincides with the inner boundary of the third zone, the method further comprises determining, using the motion capture system, a third location of the user within the actual space of the environment, wherein the third location is within the third zone, and wherein movement of the user in the virtual world is at a greater speed when the user is located in the third zone compared to when the user is located in the second zone.

The environment (which may be portable) may optionally be an enclosed structure in which the user is located during implementation of the method.

The method may yet further comprise determining, using the evaluation criteria, direction and speed of the user within the virtual world.

In an embodiment, the motion capture system comprises floor sensors provided within the first zone and the second zone that provide feedback data indicative of the location of the user within the actual space of the environment, and wherein the evaluation criteria comprises information corresponding to the feedback data. Alternatively, the motion capture system comprises at least one motion capture camera that detects when a user is located within the first zone or the second zone and that provides feedback data indicative of the location of the user within the actual space of the environment, and wherein the evaluation criteria comprises information corresponding to the feedback data.

Embodiments are also directed to a system for triggering movement of a user in a virtual immersive environment. The system comprises a motion capture system that determines a first location of the user within an actual space of the environment, wherein the actual space of the environment includes a plurality of concentric zones centered about a center point of the actual space of the environment, the plurality of concentric zones includes a first zone and a second zone, the first zone includes the center point and is defined by an outer boundary, the second zone surrounds the first zone and is defined by an inner boundary and an outer boundary, wherein the outer boundary of the first zone coincides with the inner boundary of the second zone, wherein the first location is within a first zone, the motion capture system also determines a second location of the user within the actual space of the environment, and wherein the second location is within the second zone. The system also comprises a sensory interface that receives evaluation criteria derived from the motion capture system, wherein the evaluation criteria is used to trigger movement of the user within a virtual world when the user moves from the first zone to the second zone, and wherein the sensory interface generates sensory messages corresponding to the evaluation criteria. The evaluation criteria may preferably be used to determine direction and speed of the user within the virtual world. The system further comprises a sensory output system that receives the sensory messages which instruct the sensory output system to create sensory effects. The sensory output system includes at least one imaging device (e.g., a projector, LCD display, LED display, OLED display, etc.) and the sensory effects include video images.

In an embodiment, movement of the user within the virtual world may not be triggered when the user is located in the first zone, and movement of the user within the virtual world may be at a constant speed when the user is located in the second zone. Movement of the user within the virtual world may be at a constant speed when the user is standing still while located in the second zone.

In an embodiment, the plurality of concentric zones further includes a third zone that surrounds the second zone and is defined by an inner boundary and an outer boundary, wherein the outer boundary of the second zone coincides with the inner boundary of the third zone. The motion capture system further determines a third location of the user within the actual space of the environment, wherein the third location is within the third zone, and wherein movement of the user in the virtual world is at a greater speed when the user is located in the third zone compared to when the user is located in the second zone.

The environment (which may be portable) may optionally be an enclosed structure in which the user is located during operation of the system.

In an embodiment, the motion capture system comprises floor sensors provided within the first zone and the second zone that provide feedback data indicative of the location of the user within the actual space of the environment, and wherein the evaluation criteria comprises information corresponding to the feedback data. Alternatively, the motion capture system comprises at least one motion capture camera that detects when a user is located within the first zone or the second zone and that provides feedback data indicative of the location of the user within the actual space of the environment, and wherein the evaluation criteria comprises information corresponding to the feedback data.

BRIEF DESCRIPTION OF THE DRAWINGS

For the present invention to be clearly understood and readily practiced, the present invention will be described in conjunction with the following figures, wherein.

The detailed description will refer to the following drawings in which like numerals refer to like items, and in which.

DETAILED DESCRIPTION

It is to be understood that the figures and descriptions of the present invention may have been simplified to illustrate elements that are relevant for a clear understanding of the present invention, while eliminating, for purposes of clarity, other elements found in a typical virtual immersive environment, typical triggering movement system, or typical triggering movement method. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Described herein are embodiments of a system and method for providing a virtual immersive environment and for triggering movement of a user in a virtual immersive environment. Embodiments provide a portable virtual immersive environment, a virtual immersive portable environment holodeck or "VIPE" holodeck. Embodiments overcome the problems described above.

Embodiments provide a virtual immersive environment with a 360-degree field of view and an ultra-realistic simulated and interactive sensory environment that facilitates user disbelief of not being in a real environment. Embodiments introduce a new physical structure, sensors and components that provide a new and novel platform for displaying and interacting with virtual environments. Embodiments also introduce new methods and the use of proven technologies to improve the fidelity associated with mimicking human visual and sensory responses. Embodiments provide a 360-degree vertical and horizontal field of view platform that displays virtual environments and integrates sensors to sense user actions so that the environment can react to the user actions. Embodiments are designed for use in military simulation, entertainment, training, medical health, emergency preparedness planning, etc.

Embodiments are designed and constructed so that the structure of the VIPE Holodeck™ may be built in a day (e.g., by four (4) people) and torn down in a day. Moreover, once torn down, embodiments of the VIPE holodeck structure may be moved on a single box truck.

Embodiments reflect the importance of stimulating all or most of a person's sensory systems in the virtual immersive environment. Embodiments accomplish this stimulation through the integration of sensory invoking systems and the development of a sensory interface (the VIPE sensory interface). The VIPE sensory interface provides the ability to orchestrate the sensory invoking systems in a realistic and immersive fashion. This approach provides an environment that suspends the user's disbelief of not being in the real environment.

Figures 1A, 1B, 1C:
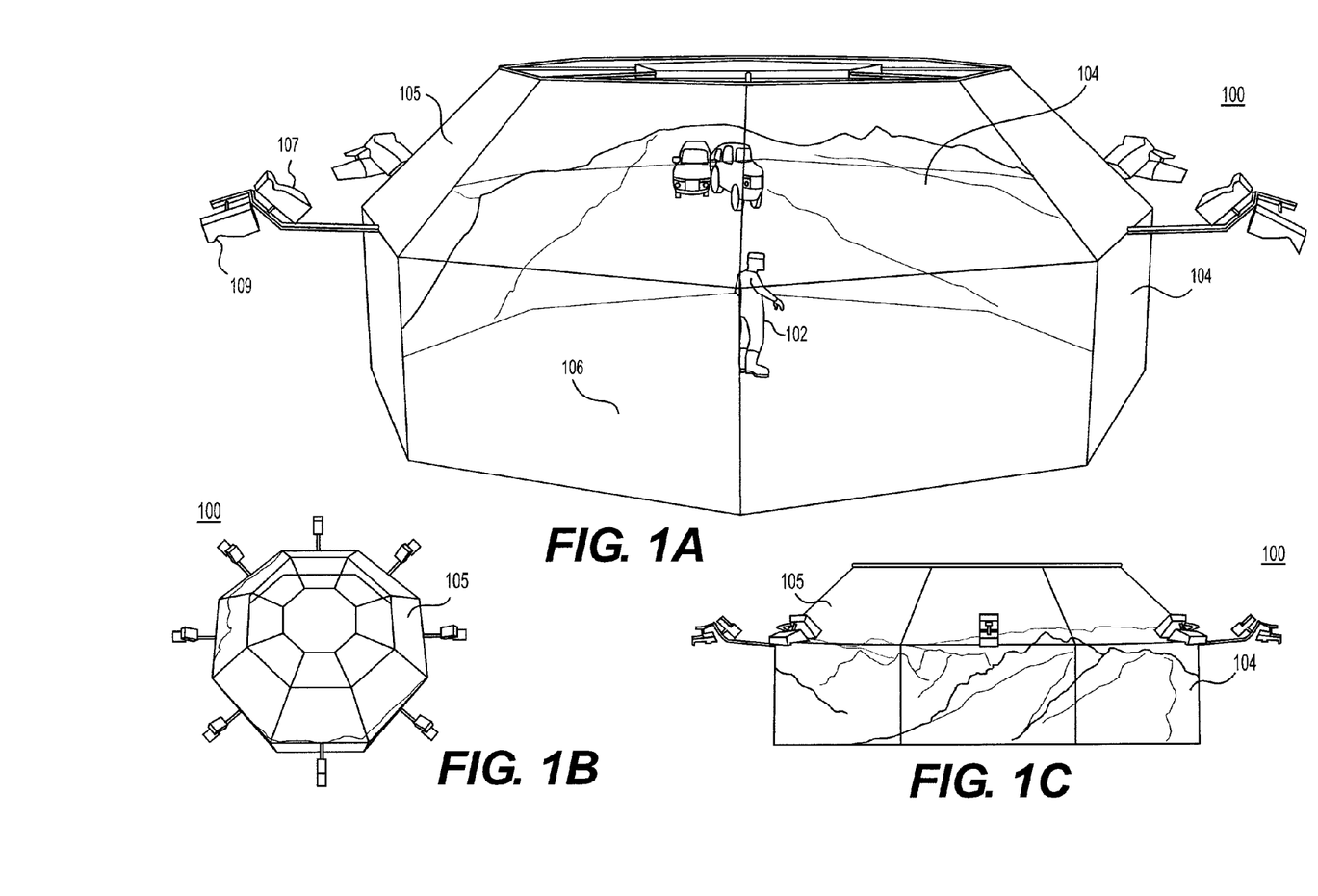
FIGS. 1A-1C are diagrams, in various perspective views, illustrating an embodiment of a virtual immersive portable environment holodeck.

With reference now to FIGS. 1A-1C, shown in various perspective views is an embodiment of a VIPE holodeck 100. The embodiment of the VIPE holodeck 100 shown creates an ultra-realistic simulated environment by completely surrounding a user 102 with visual, audio, olfactory, and tactile sensory inputs. To provide a visual sensory input, the user 102 is preferably surrounded by screens 104 that display projector-based computer generated images (CGI) on them. In the embodiment shown, the VIPE holodeck 100 includes sixteen (16) rectangular and trapezoidal screens arranged in an octagonal/domed shape surrounding the user 102. Other configurations, shapes and number of screens 104 may alternatively be used. The screens 104 provide the majority of the immersive environment. Consequently, it is most important that the screens 104 present high fidelity images to the user 102.

Additionally, the VIPE holodeck 100 includes, above the user 102, eight (8) trapezoidal screens 105, creating a domed shape. In an embodiment of the VIPE holodeck 100, each of the total sixteen (16) screens presents a rear projected, high definition image. In an embodiment, the eight (8) vertical screens 104 that create the octagon surrounding the user 102 have one projector 107 and one computer (not shown) per screen 104 serving up the CGI. In an embodiment, the eight (8) screens above the user 102 utilize one projector 109 for every screen and one computer (not shown) driving every two projectors (i.e., one computer driving the CGI for every two (2) screens).

With continued reference to FIG. 1A, the floor of the environment 100 is lined with a projected screen material 106 that reflects an image casted from two projectors above the user 102. In an embodiment, the two projectors that cast the floor image are driven by a single computer (not shown). In an embodiment, image alignment for all the images shown on the various screens in the VIPE holodeck 100 is controlled via alignment technology to ensure a seamless image stretched around the user.

Figure 2:
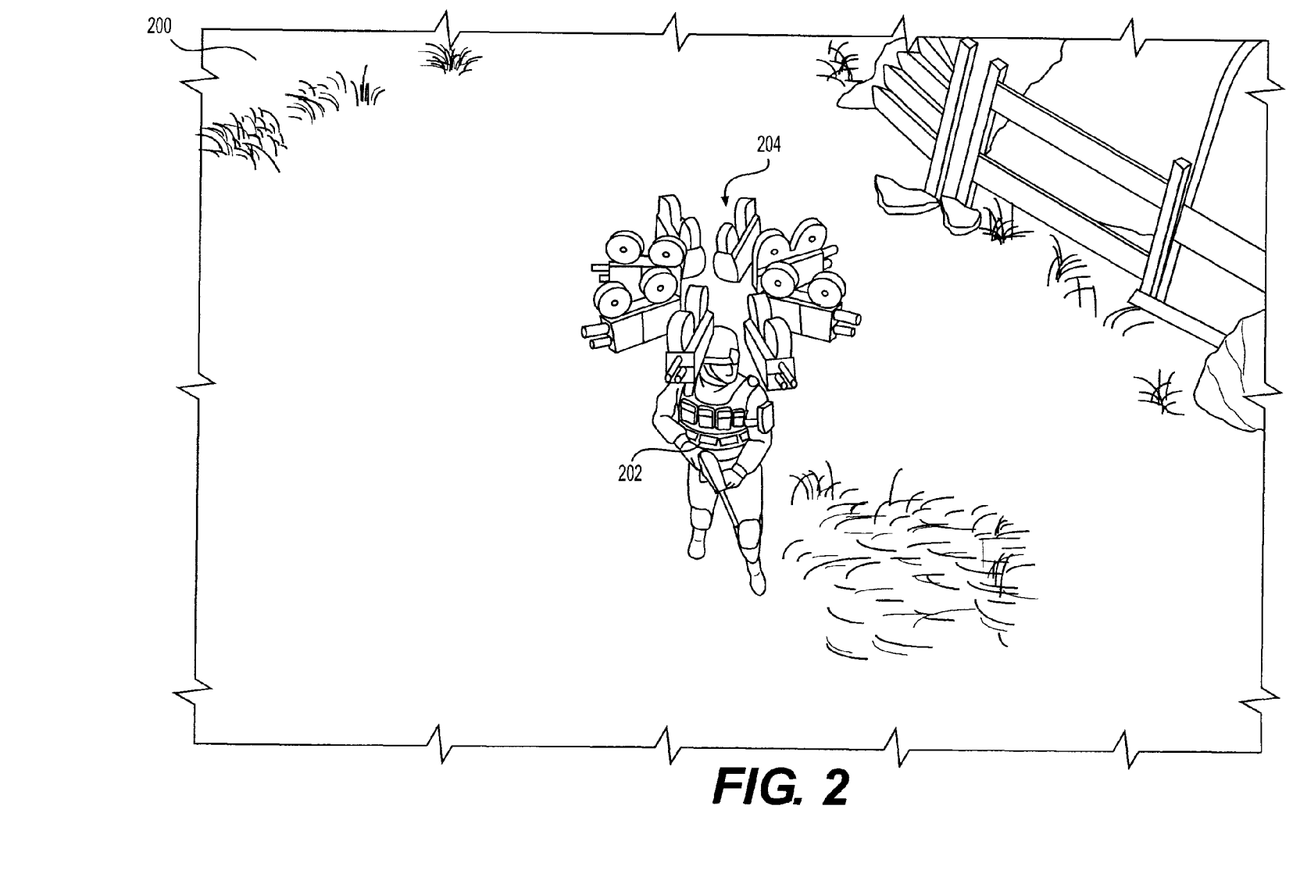
FIG. 2 illustrates a virtual panoramic camera rig used to render a 360 degree view in the virtual environment.

With reference now to FIG. 2, shown is an image of a user's avatar 202 inside a virtual environment 200 that may be created by embodiments of the VIPE holodeck. The CGI that is presented to the user in embodiments of the VIPE holodeck may be developed using high-end graphic rendering technology. Different specific technologies may be used for different applications. For applications that require higher levels of interaction between the scenario and the user, e.g., training scenarios, high-end gaming engines are typically used. For applications that require extremely high levels of detail and accuracy, e.g., data analysis, scientific and engineering rendering tools may be used. Inside the computer generated environment 200, a virtual camera rig 204 may be created that replicates the exact angles and field of views from the point of view or position of the user 202 that would be present in the actual physical environment, as shown in FIG. 2. These individual cameras are then channeled, via a multi-channel rendering plug-in (not shown), to each corresponding projector (for the opposing screen shown in FIGS. 1A-1C), creating a visually aligned and seamless replication of the virtually created environment.

In addition to the high fidelity visualization that is presented within embodiments of the VIPE holodeck structure, a number of sensory invoking systems are integrated to create an ultra-realistic environment that is necessary to create a state of disbelief that the user is not in the real world environment. Embodiments provide a VIPE sensory interface, a message-based interface-translation layer between the game scenario and the attached sensory provoking systems.

Figure 3:
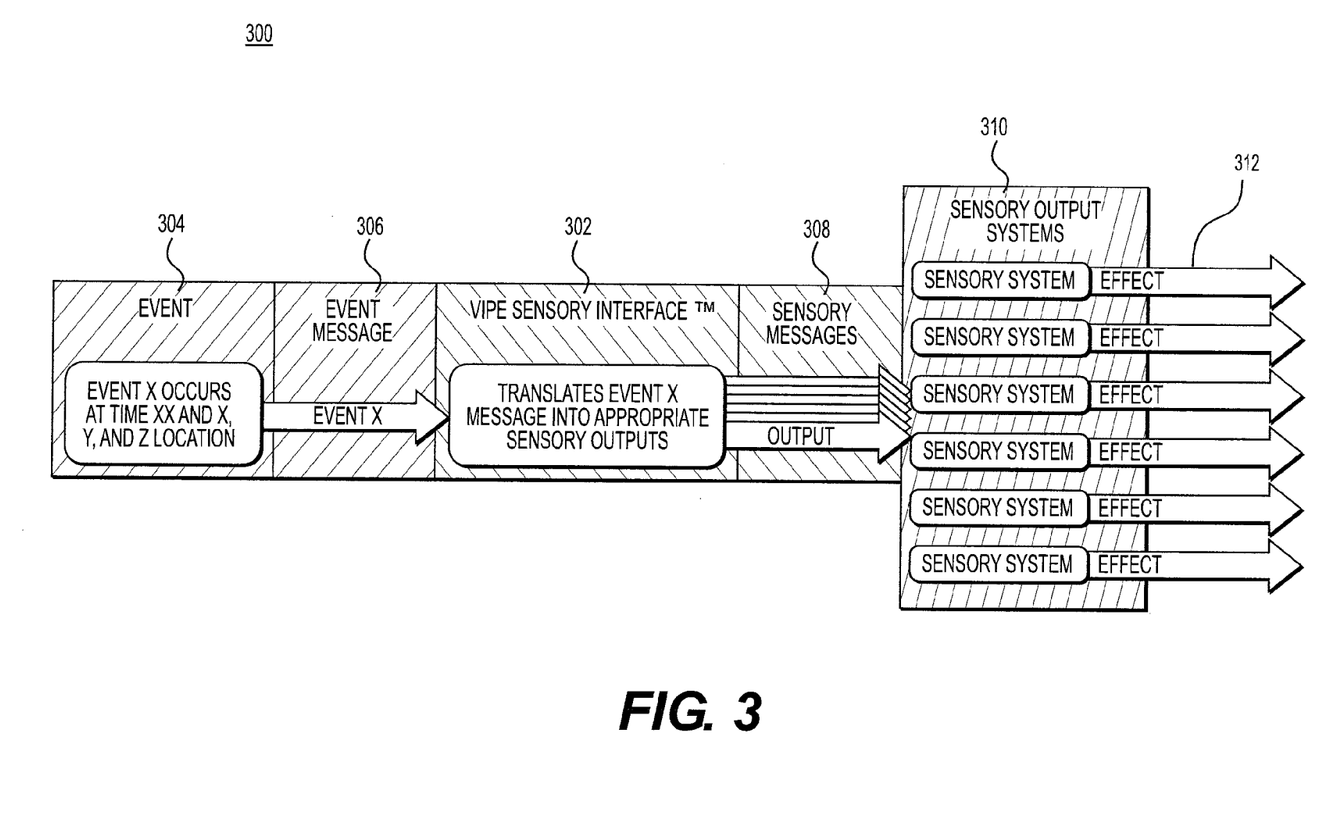
FIG. 3 is a flow diagram illustrating an embodiment of a method for processing and providing sensory events in a virtual immersive portable environment holodeck and illustrating a virtual immersive portable environment sensory interface.

With reference now to FIG. 3, shown is a process flow 300 of an embodiment of a method for creating or replicating an event in an embodiment of a VIPE holodeck. The process flow 300 also illustrates an embodiment of a VIPE sensory interface 302. The VIPE sensory interface 302 is an easily expandable and modifiable interface that automatically triggers appropriate sensory output systems 310, incorporated in the VIPE holodeck. The VIPE sensory interface 302 receives a specific event that occurs in the virtual environment (e.g., a gunshot) and translates the specific event into appropriate sensory outputs (e.g., pulsing light, directional sound, and haptic vest) necessary to reinforce that event (to "create" the event in the VIPE holodeck). In process flow 300, event 304 occurs (e.g., as dictated by simulation program, recording of real-world event being replicated in the VIPE, or triggered by movement of a user within the VIPE). Event 304 occurs at a time and a location. The event description, time and location (e.g., relative to the user's position in the VIPE) are provided in an event message 306 to the VIPE sensory interface 302. The VIPE sensory interface 302 translates the event 304 into appropriate sensory outputs. The VIPE sensory interface 302 sends various sensory messages 308 to sensory output systems 310 in the VIPE holodeck. The sensory messages 308 instruct the sensory output systems 310 (e.g., sounds, images, light, movement, smoke, fog, vibration, etc.) to create the necessary sensory effects 312 in the VIPE. The sensory output systems 310 may include the projectors described above, displays (e.g., of LCD, LED, OLED type), sounds systems, olfactory output devices (to create smells), special effects devices (e.g., fog or smoke dispensers), actuators, motors, tactile gloves and vests and other devices (to create the sensation of movement and vibrations), etc. The sensory effects 312 create the impression for the user in the VIPE that the event 304 actually occurred.

Figure 4:
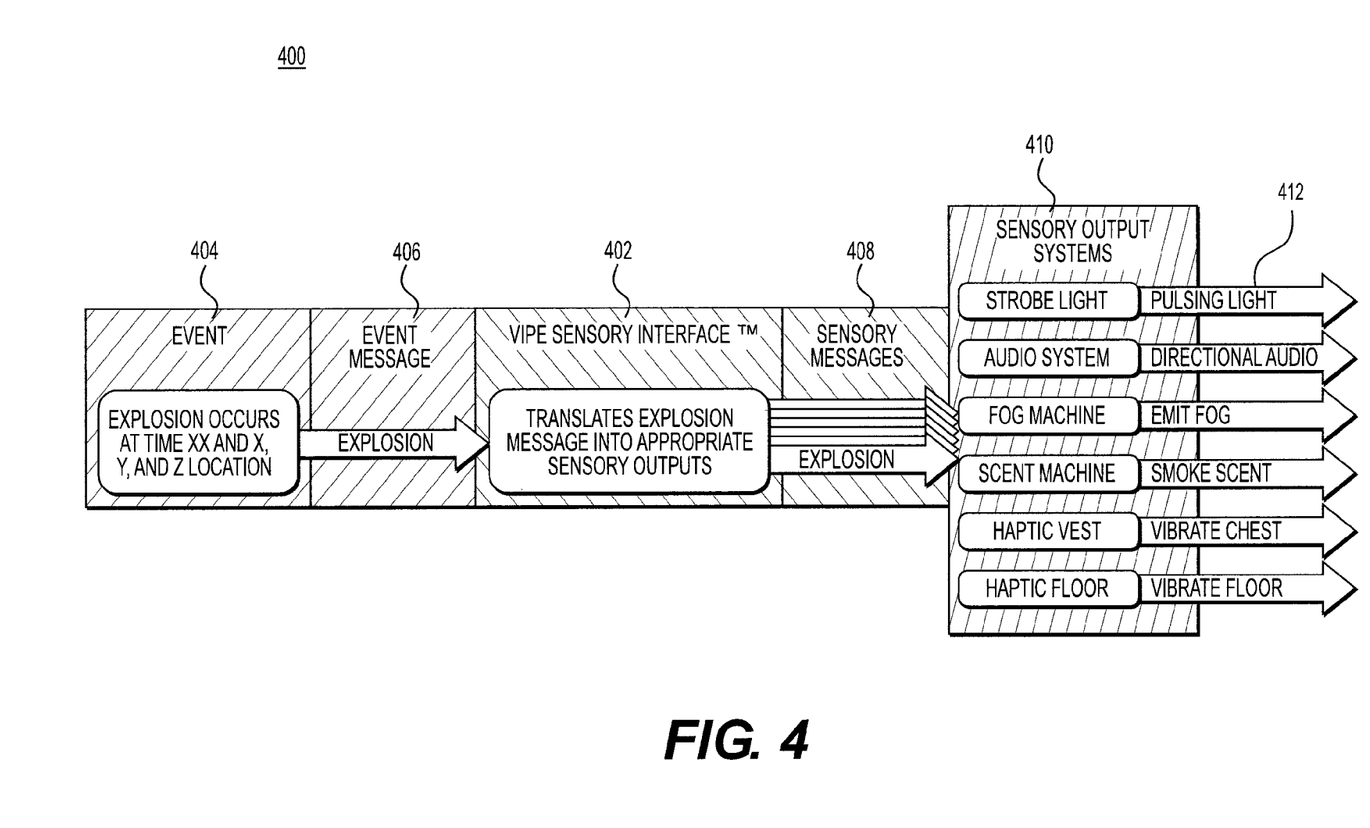
FIG. 4 is a flow diagram illustrating an embodiment of a method for processing and providing an exemplary event in a virtual immersive portable environment holodeck and illustrating a virtual immersive portable environment sensory interface.

With reference now to FIG. 4, shown is a process flow 400 of an embodiment of a method for creating or replicating an event 404 in an embodiment of a VIPE holodeck in which the event 404 is an explosion. Process flow 400 shows how explosion event 404 is translated to a number of sensory output systems 410. Explosion event 404 occurs at a specific time and location. An event message 406 with descriptive details about the explosion, as well as the time and location of the explosion, are sent to the VIPE sensory interface 402. The VIPE sensory interface 402 translates the explosion event 404 into various sensory outputs that will create the explosion in the VIPE. Sensory messages 408 are sent to the sensory output systems 410. The sensory output systems 410 create the specific sensory effects 412 determined by the VIPE sensory interface 402 to be necessary to create the event in the VIPE. Accordingly, the VIPE sensory interface 402 can trigger specific sensory systems 410, based on the event information received, so that, for example, only the strobe lights, fog dispensers and floor vibrations that correspond to the direction and location of the explosion are triggered.

As noted above, one such sensory invoking system is strobe lights. Embodiments of the VIPE holodeck integrate strobe lights. Such strobe lights are placed at the base and the top of the VIPE holodeck and may be triggered in context with and to enhance important and significant elements in a scenario. The addition of quick and intense visual stimulation triggers a number of emotions and reactions from a user that would not otherwise be triggered with just projectors. Strobe lights can be used to enhance specific scenario events such as, explosions, lightening, gun shots, emergency lighting, etc.

Moreover, as noted, embodiments of the VIPE holodeck may also include fog and smoke dispensers as sensory invoking systems. In order to provide a better sense of environment to a user, light fog may be dispensed in certain scenarios. Fog helps to fill the void space between the user and the screens, enhancing the environment and providing a heightened visual effect. Fog can be used to simulate a number of environmental effects in conjunction with typical scenes. For example, fog could enhance the effect of a dust cloud being kicked up by a helicopter landing, or smoke from an explosion or fire, or even enhance the sensation of rain being visually displayed in the virtual environment.

As mentioned above, high fidelity visual sensory input is a critical piece for an ultra-realistic simulated environment. However, providing other realistic sensory inputs are critical to creating a state of disbelief of not being in the real environment. Sound, smell and touch must also be invoked. Sound may be created by vibrations that propagate through a medium, such as air, and are, therefore, directional in nature. Providing multi-channel, directional audio aids the user in orienting themselves in the virtual environment by providing a natural contextual link between what and where the user sees and what and where the user hears. Because sound is created by vibrations, sound can also play a role in tactile stimulation as well. Extremely low and high pitch sounds can create waves that are felt and sometimes not even heard by the user. These waves can be directional as well, so as to reinforce implied inputs and interactions to the user. Extremely low bass sounds can enhance the sensation that is both felt and heard in an explosion, for example.

The sense of smell is a powerful memory trigger as the olfactory cortex is embedded within the brain's limbic system and amygdala, where emotions are born and emotional memories are stored. Smell is also one of the more sensitive senses as well, so it is critical not to overwhelm the user. Consequently, sensory output systems in an embodiment may include a scent machine incorporated into the central air system, depositing specific scents into the air blower. Having a constant flow of air, e.g., from a blower at the top of the VIPE holodeck to returns at the base of the VIPE holodeck, ensures that the scents reach the user in time with the scenario and then are cleared out in a timely fashion as well. The scent machine may be controlled by triggers placed in the gaming engine logic, so that smells support the other senses at specific times when appropriate and not contradict them at wrong times.

Touch is one of the more difficult senses to evoke within a simulated environment. A vibrating game controller is commonly and effectively used in conjunction with driving simulation games to provide the user with the feeling of a rough road. Embodiments described herein may integrate haptic gloves and a vest that provides constant and pulsating (vibrating) force feedback to the user, as sensory invoking systems. Subtle, well-timed and well-positioned tactile stimulations can help convince the brain that it really felt or touched something. The haptic gloves and vest include multiple vibrotactile actuators placed in various positions on the user's hands, palms, chest and back. Each actuator can be programmed individually to varying strength to provide the most accurate and realistic tactile sensation. Embodiments may also integrate a tactile feedback floor as a sensory invoking system. Tactile feedback floors include six (6) degree of movement freedom floors that can also provide slight vibrations. In conjunction with scenario events, such tactile feedback floors can simulate a number of experiences for the user. For example, tilting the floor slightly can trigger the instability one might feel on the deck of a ship, or a slight vibration can be used to simulate the feeling one might have as a large truck drives by the user. Other simulated systems, such as simulated weapons, simulated optical systems, etc., can be integrated through the VIPE sensory interface, based in the needs of the scenario.

Figure 5:
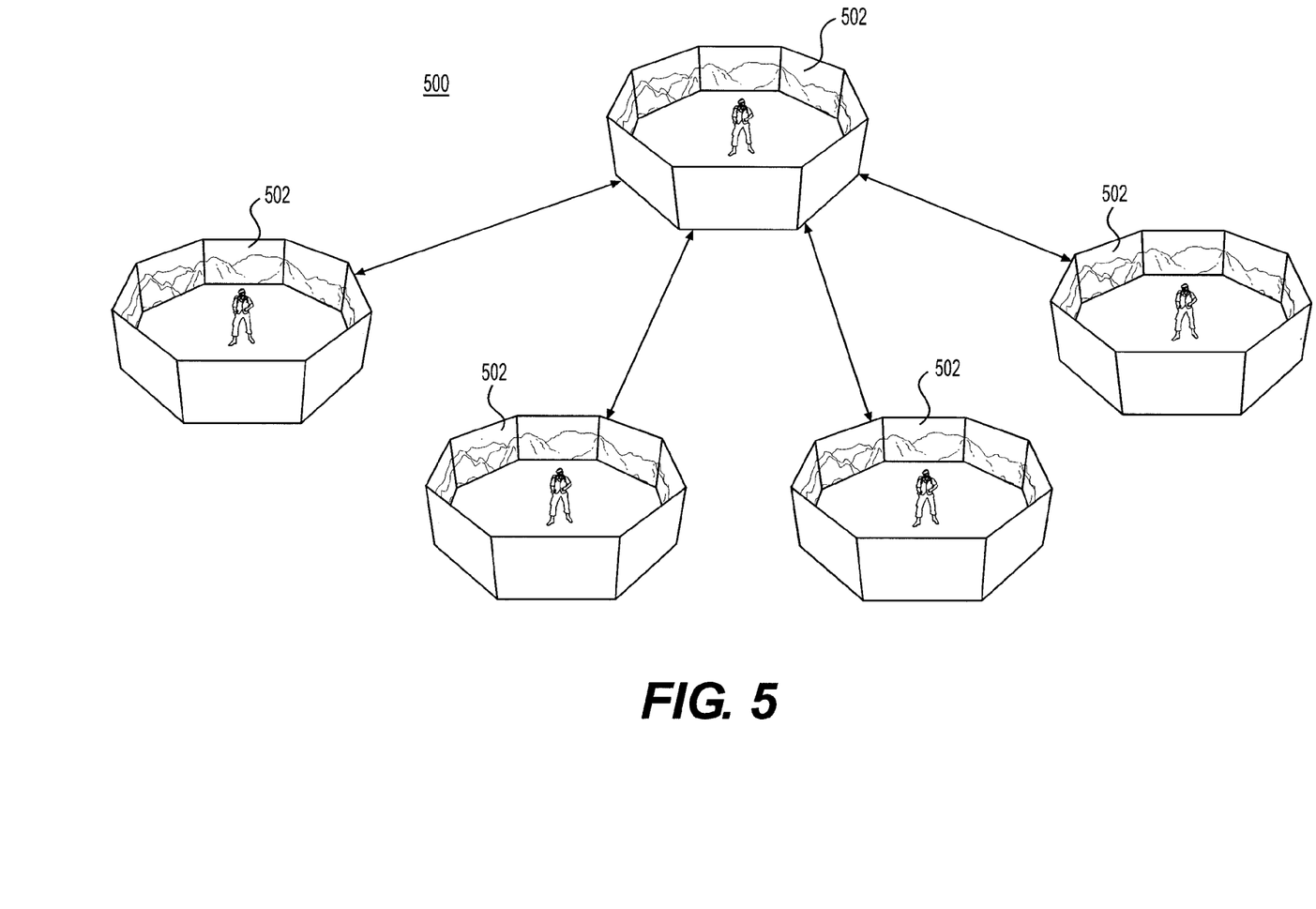
FIG. 5 is a diagram illustrating a network of virtual immersive portable environment holodecks.

With reference now to FIG. 5, shown is an embodiment of a system 500 of networked VIPE holodecks 502. Embodiments of the VIPE holodeck 502 support networking capability, to allow multiple VIPE holodecks 502 to be linked together and scenarios shared between the environments. System 500 may use a generalized client-server architecture to maintain the state of the scenario between the clients (the processors running the scenarios in each VIPE holodeck 502). Unlike typical client-server architectures, where the clients are dumb terminals receiving and displaying updates received from the server and passing updates back to the server, the clients in the system 500 architecture maintain their own state of the scenario. The main system 500 server may remain the authoritative controller of the scenario, while each client at each VIPE holodeck 502 executes decisions in a predictive manor with the information it has. Discrepancies between the client and the server are dealt with in a controlled manor, so that it is not noticeable to the user. Corrections from the server may be kept in a circular buffer and used in predictive decisions by the client logic in order to predict results closer to the authoritative server controller. This approach reduces latency and also allows the client machines to share in the workload of scenario logic and rendering.

When utilizing VIPE holodecks 502 in a networked fashion, it is important to not only show the common shared scenario in the networked environments, but also to display an avatar for each user in the joined environments as well. An avatar is a computer generated character that is being controlled by a human. In order for the avatar to replicate the user's actions in a believable and realistic manor in the joined environments, motion-capture technology is used. Embodiments may take advantage of marker-less motion-capture technology/system, allowing the user to be free of any sensors attached to the user's body. Accordingly, embodiments of the VIPE holodeck 502 may include, e.g., eight (8) motion capture cameras placed in the environment surrounding the user. Marker-less motion capture creates a three-dimensional (3D) image by evaluating multiple image feeds and extracting the silhouettes of the user from the different angles. Marker-less motion capture then merges those silhouettes into an estimated 3D model. A character wireframe is estimated and the models motions are applied to the wireframe and then applied to the user's avatar, resulting in movements that mimic the user inside the environment. Using this process, movements by a user in one VIPE holodeck 502 are able to automatically drive the movements of computer generated avatar for that user in the other, networked VIPE holodecks 502.

Another important aspect of embodiments of the VIPE holodeck is that a user must be able to freely and realistically move about the virtual environment in an intuitive fashion. Accordingly, embodiments may take advantage of the marker-less motion capture technology again for this interface between the user and the virtual world. Since the environment has, e.g., eight (8) motion capture cameras surrounding the user, it is easy to extrapolate where the user is in the actual space of the VIPE holodeck. Depending on where the user moves in the VIPE holodeck, movement in the virtual world is triggered with evaluation criteria determining the direction and speed.

Figure 6A:
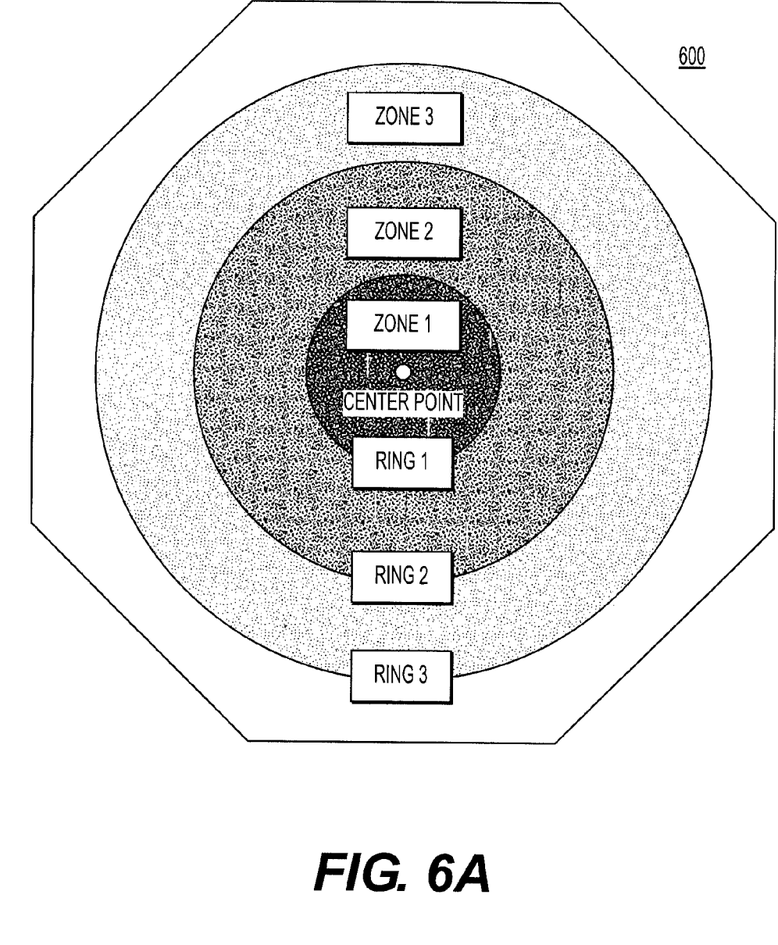
FIGS. 6A-6B are diagrams illustrating top-down views of the actual space of the environment of an embodiment of a virtual immersive portable environment holodeck and the movement of a user within the virtual environment/world provided by such an embodiment.
Figure 6B:
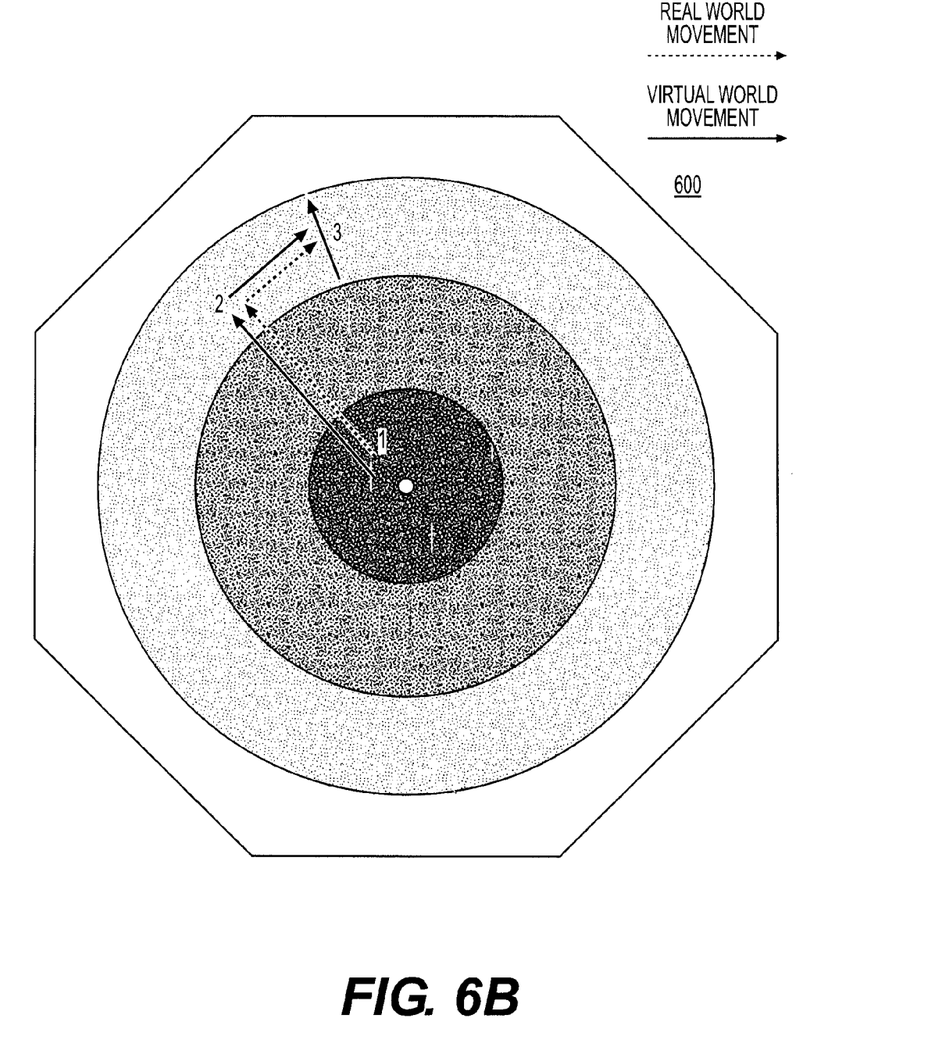

With reference now to FIGS. 6A-6B, shown is a top down view of the space of an embodiment of a hexagonal VIPE holodeck 600. The space of the VIPE holodeck 600 is divided into, for example, three zones, zone 1, zone 2 and zone 3, separated by three rings, ring 1, ring 2, and ring 3. As shown, the center of the actual space 600 within zone 1 preferably does not trigger motion in the virtual world. As the user moves out of the center zone 1 and crosses ring 1, the user's motion in that specific direction slowly increases or immediately increases. This allows the user the ability to increase their speed from a slow walk to a run the further they move from the center zone 1.

As the user moves, the system constantly evaluates the virtual environment so that, e.g., as the user approaches virtual objects they do not run into or through the virtual objects. In embodiments, as the user approaches objects in the virtual world, they are automatically slowed to a walk and then stopped next to that object, this allows them to stop, next to a virtual object without having to return back to the center of the structure. For the user to then, for example, go around the object, the user can just move in the direction that they would want to go to go around that object. FIG. 6B diagrams this, illustrating how a user may walk up to a car, stop and then go around it. As shown, as a user moves from point 1 (in center zone 1) to point 2 (through zone 2 to zone 3), the user starts to walk and then run in the virtual environment in that direction. When the user runs into a virtual obstacle, the user stops moving in the virtual environment. To go around the obstacle, the user moves to point 3. In the virtual world, the user slides to the right until they get around the obstacle and then they start running forward again. To slow to a walk the user may physically move back to zone 2. The dashed lines in FIG. 6B show real world movement, while the solid line shows virtual world/environment movement.

In order to determine the location of the user in actual space of the environment, the marker-less motion capture technology/system mentioned in any of the embodiments above may be employed. Alternatively, other motion capture systems may alternatively be employed such as marker-containing motion capture technologies/systems and/or floor sensors (e.g., of the type that sense weight of the user upon stepping thereon such as weight-sensing scale-type platforms) provided within each zone that provide feedback data indicative of the location of the user within the actual space of the environment.

As described above, embodiments are directed to a method for triggering movement of a user in a virtual immersive environment. The method comprises determining, using a motion capture system, a first location of the user within an actual space of the environment, wherein the actual space of the environment includes a plurality of concentric zones centered about a center point of the actual space of the environment, the plurality of concentric zones includes a first zone and a second zone, the first zone includes the center point and is defined by an outer boundary, the second zone surrounds the first zone and is defined by an inner boundary and an outer boundary, wherein the outer boundary of the first zone coincides with the inner boundary of the second zone, and wherein the first location is within a first zone. The method also comprises determining, using the motion capture system, a second location of the user within the actual space of the environment, wherein the second location is within the second zone. The method further comprises triggering movement of the user within a virtual world using evaluation criteria derived from the motion capture system when the user moves from the first zone to the second zone.

In an embodiment, movement of the user within the virtual world may not be triggered when the user is located in the first zone, and movement of the user within the virtual world may be at a constant speed when the user is located in the second zone. Movement of the user within the virtual world may be at a constant speed when the user is standing still while located in the second zone.

In an embodiment, the plurality of concentric zones further includes a third zone that surrounds the second zone and is defined by an inner boundary and an outer boundary, wherein the outer boundary of the second zone coincides with the inner boundary of the third zone, the method further comprises determining, using the motion capture system, a third location of the user within the actual space of the environment, wherein the third location is within the third zone, and wherein movement of the user in the virtual world is at a greater speed when the user is located in the third zone compared to when the user is located in the second zone.

The environment (which may be portable) may optionally be an enclosed structure in which the user is located during implementation of the method.

The method may yet further comprise determining, using the evaluation criteria, direction and speed of the user within the virtual world.

In an embodiment, the motion capture system comprises floor sensors provided within the first zone and the second zone that provide feedback data indicative of the location of the user within the actual space of the environment, and wherein the evaluation criteria comprises information corresponding to the feedback data. Alternatively, the motion capture system comprises at least one motion capture camera that detects when a user is located within the first zone or the second zone and that provides feedback data indicative of the location of the user within the actual space of the environment, and wherein the evaluation criteria comprises information corresponding to the feedback data.

As described above, embodiments are also directed to a system for triggering movement of a user in a virtual immersive environment. The system comprises a motion capture system that determines a first location of the user within an actual space of the environment, wherein the actual space of the environment includes a plurality of concentric zones centered about a center point of the actual space of the environment, the plurality of concentric zones includes a first zone and a second zone, the first zone includes the center point and is defined by an outer boundary, the second zone surrounds the first zone and is defined by an inner boundary and an outer boundary, wherein the outer boundary of the first zone coincides with the inner boundary of the second zone, wherein the first location is within a first zone, the motion capture system also determines a second location of the user within the actual space of the environment, and wherein the second location is within the second zone. The system also comprises a sensory interface that receives evaluation criteria derived from the motion capture system, wherein the evaluation criteria is used to trigger movement of the user within a virtual world when the user moves from the first zone to the second zone, and wherein the sensory interface generates sensory messages corresponding to the evaluation criteria. The evaluation criteria may preferably be used to determine direction and speed of the user within the virtual world. The system further comprises a sensory output system that receives the sensory messages which instruct the sensory output system to create sensory effects. The sensory output system includes at least one imaging device (e.g., a projector, LCD display, LED display, OLED display, etc.) and the sensory effects include video images.

In an embodiment, movement of the user within the virtual world may not be triggered when the user is located in the first zone, and movement of the user within the virtual world may be at a constant speed when the user is located in the second zone. Movement of the user within the virtual world may be at a constant speed when the user is standing still while located in the second zone.

In an embodiment, the plurality of concentric zones further includes a third zone that surrounds the second zone and is defined by an inner boundary and an outer boundary, wherein the outer boundary of the second zone coincides with the inner boundary of the third zone. The motion capture system further determines a third location of the user within the actual space of the environment, wherein the third location is within the third zone, and wherein movement of the user in the virtual world is at a greater speed when the user is located in the third zone compared to when the user is located in the second zone.

The environment (which may be portable) may optionally be an enclosed structure in which the user is located during operation of the system.

In an embodiment, the motion capture system comprises floor sensors provided within the first zone and the second zone that provide feedback data indicative of the location of the user within the actual space of the environment, and wherein the evaluation criteria comprises information corresponding to the feedback data. Alternatively, the motion capture system comprises at least one motion capture camera that detects when a user is located within the first zone or the second zone and that provides feedback data indicative of the location of the user within the actual space of the environment, and wherein the evaluation criteria comprises information corresponding to the feedback data.

Figure 7:
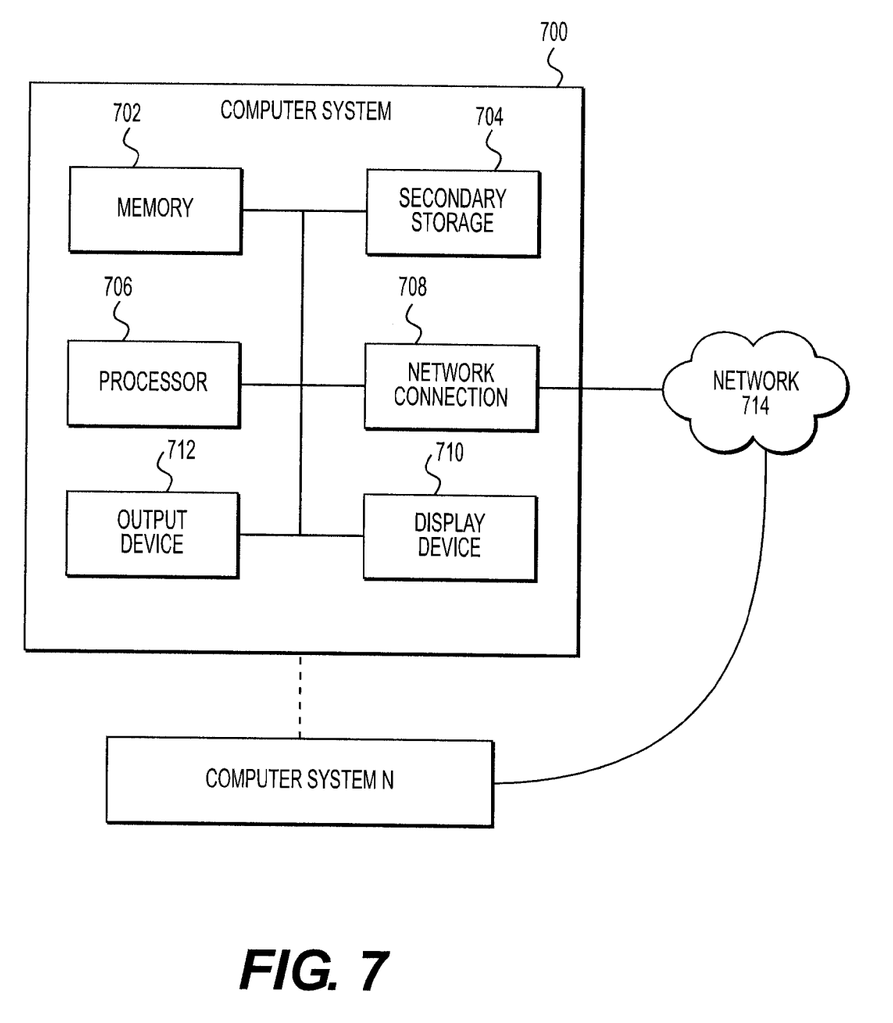
FIG. 7 is a block diagram illustrating an embodiment of a computer system that may be used in embodiments of a virtual immersive portable environment holodeck.

With reference now to FIG. 7, shown is a diagram of an exemplary computer system 700 that may be used in embodiments as described above. Such computer systems may be used to control various functions of the embodiments described above, such as controllers for various projectors, as VIPE sensory interface, as control computers for various sensory output systems, as client and server controlling VIPE holodecks and networked VIPE holodecks, etc. Computer system 700 may be configured as a stand-alone machine, a server, as part of a bladed server system, integrated into another device, etc. Computer system 700 typically includes a memory 702, a secondary storage 704, one or more processor 706 (e.g., a multi-processor server may include multiple processors) and a network connection 708. Some computer systems 700 may also include an input device (not shown), a display device 710, and an output device 712. Computer system 700 may connect to a network 714, as described above. Memory 702 may include RAM or similar types of memory, and it may store one or more applications, providing functionality described herein, for execution by processor(s) 706. Secondary storage device 704 may include a hard disk drive, floppy disk drive, CD-ROM drive, or other types of non-volatile data storage. Processor(s) 706 executes the application(s), which is stored in memory 702 or secondary storage 704, or received from the Internet or other network 714. Input device may include any device for entering information into computer system 700, such as a keyboard, mouse, cursor-control device, touch-screen, microphone, digital camera, video recorder or camcorder. Display device 710 may include any type of device for presenting visual information such as, for example, a computer monitor or flat-screen display. Output device 712 may include any type of device for presenting a hard copy of information, such as a printer, and other types of output devices include speakers or any device for providing information in audio form.

Computer system 700 may store a database structure in secondary storage 704, for example, for storing and maintaining information needed or used by the application(s). Also, processor(s) 706 may execute one or more software applications in order to provide the functions described in this specification, specifically in the methods described above, and the processing may be implemented in software, such as software modules, for execution by computers or other machines. The processing may provide and support web pages and other GUIs. The GUIs may be formatted, for example, as web pages in HyperText Markup Language (HTML), Extensible Markup Language (XML) or in any other suitable form for presentation on a display device.

Although computer system 700 is depicted with various components, one skilled in the art will appreciate that the servers can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling a computer system, such as computer system 700, to perform a particular method.

Although the embodiments described throughout this disclosure utilize a virtual immersive portable environment (VIPE) holodeck, a non-portable virtual immersive environment (i.e., utilizing or not utilizing a holodeck) may alternatively be employed in any of the embodiments.

Additionally, although the embodiments described throughout this disclosure utilize a virtual immersive environment with a 360-degree field of view, a virtual immersive environment with a non-360-degree field of view may alternatively be employed in any of the embodiments. Examples of such a virtual immersive environment with a non-360-degree field of view include a head-mounted display system such as the Oculus Rift from Oculus VR® or Google Glass from Google corporation. These virtual immersive environments with a non-360-degree field of view may incorporate any of the sensory effects (e.g., 312, 412) mentioned in any of the above embodiments. The sensory output systems (e.g., 310, 410) may be integral with or separate from any of the virtual immersive environments with a non-360-degree field of view. In any of the virtual immersive environments, the visual display may be employed utilizing projectors to project images/video on a screen/surface, or the visual display may alternatively be provided in other forms such as an LCD, LED, or OLED screens.

The contemplated modifications and variations specifically mentioned above are considered to be within the spirit and scope of the present invention.

Those of ordinary skill in the art will recognize that various modifications and variations may be made to the embodiments described above without departing from the spirit and scope of the present invention. It is therefore to be understood that the present invention is not limited to the particular embodiments disclosed above, but it is intended to cover such modifications and variations as defined by the following claims.

The invention claimed is:

1. A method for triggering movement of a user in a virtual immersive environment, the method comprising:
   determining, using a motion capture system, a first location of the user within an actual space of the environment, wherein the actual space of the environment includes a plurality of concentric zones centered about a center point of the actual space of the environment, the plurality of concentric zones includes a first zone and a second zone, the first zone includes the center point and is defined by an outer boundary, the second zone surrounds the first zone and is defined by an inner boundary and an outer boundary, wherein the outer boundary of the first zone coincides with the inner boundary of the second zone, and wherein the first location is within a first zone;
   determining, using the motion capture system, a second location of the user within the actual space of the environment, wherein the second location is within the second zone; and
   triggering movement of the user within a virtual world using evaluation criteria derived from the motion capture system when the user moves from the first zone to the second zone, wherein movement of the user within the virtual world is at a constant speed when the user is standing still while located in the second zone.

2. The method of claim 1, wherein movement of the user within the virtual world is not triggered when the user is located in the first zone.

3. The method of claim 1, wherein the plurality of concentric zones further includes a third zone that surrounds the second zone and is defined by an inner boundary and an outer boundary, wherein the outer boundary of the second zone coincides with the inner boundary of the third zone, the method further comprising determining, using the motion capture system, a third location of the user within the actual space of the environment, wherein the third location is within the third zone, and wherein movement of the user in the virtual world is at a greater speed when the user is located in the third zone compared to when the user is located in the second zone.

4. The method of claim 1, wherein the environment is an enclosed structure in which the user is located during implementation of the method.

5. The method of claim 4, wherein the environment is portable.

6. The method of claim 1 further comprising determining, using the evaluation criteria, direction and speed of the user within the virtual world.

7. The method of claim 1, wherein the motion capture system comprises floor sensors provided within the first zone and the second zone that provide feedback data indicative of the location of the user within the actual space of the environment, and wherein the evaluation criteria comprises information corresponding to the feedback data.

8. The method of claim 1, wherein the motion capture system comprises at least one motion capture camera that detects when a user is located within the first zone or the second zone and that provides feedback data indicative of the location of the user within the actual space of the environment, and wherein the evaluation criteria comprises information corresponding to the feedback data.

9. The method of claim 1 further comprising providing sensory effects of the virtual world to the user, including sensory effects corresponding to the movement of the user in the virtual world.

10. The method of claim 9 wherein the sensory effects include one or more sensory effects chosen from a list consisting of visual, audio, olfactory and tactile sensory effects.

11. A method for triggering movement of a user in a virtual immersive environment, the method comprising:
   determining, using a motion capture system, a first location of the user within an actual space of the environment, wherein the actual space of the environment includes a plurality of concentric zones centered about a center point of the actual space of the environment, the plurality of concentric zones includes a first zone and a second zone, the first zone includes the center point and is defined by an outer boundary, the second zone surrounds the first zone and is defined by an inner boundary and an outer boundary, wherein the outer boundary of the first zone coincides with the inner boundary of the second zone, and wherein the first location is within a first zone;
   determining, using the motion capture system, a second location of the user within the actual space of the environment, wherein the second location is within the second zone; and
   triggering movement of the user within a virtual world using evaluation criteria derived from the motion capture system when the user moves from the first zone to the second zone, wherein movement of the user within the virtual world is at a constant speed when the user is located in the second zone.

12. A system for triggering movement of a user in a virtual immersive environment, the system comprising:
   a motion capture system that determines a first location of the user within an actual space of the environment, wherein the actual space of the environment includes a plurality of concentric zones centered about a center point of the actual space of the environment, the plurality of concentric zones includes a first zone and a second zone, the first zone includes the center point and is defined by an outer boundary, the second zone surrounds the first zone and is defined by an inner boundary and an outer boundary, wherein the outer boundary of the first zone coincides with the inner boundary of the second zone, wherein the first location is within a first zone, the motion capture system also determines a second location of the user within the actual space of the environment, and wherein the second location is within the second zone;
   a sensory interface that receives evaluation criteria derived from the motion capture system, wherein the evaluation criteria is used to trigger movement of the user within a virtual world when the user moves from the first zone to the second zone, the sensory interface generates sensory messages corresponding to the evaluation criteria, and movement of the user within the virtual world is at a constant speed when the user is standing still while located in the second zone; and
   a sensory output system that receives the sensory messages which instruct the sensory output system to create sensory effects.

13. The system of claim 12, wherein the sensory output system includes at least one imaging device and the sensory effects include video images.

14. The system of claim 12, wherein movement of the user within the virtual world is not triggered when the user is located in the first zone.

15. The system of claim 12, wherein the plurality of concentric zones further includes a third zone that surrounds the second zone and is defined by an inner boundary and an outer boundary, wherein the outer boundary of the second zone coincides with the inner boundary of the third zone, the motion capture system further determines a third location of the user within the actual space of the environment, wherein the third location is within the third zone, and wherein movement of the user in the virtual world is at a greater speed when the user is located in the third zone compared to when the user is located in the second zone.

16. The system of claim 12, wherein the environment is an enclosed structure in which the user is located during operation of the system.

17. The system of claim 16, wherein the environment is portable.

18. The system of claim 12, wherein the evaluation criteria is used to determine direction and speed of the user within the virtual world.

19. The system of claim 12, wherein the motion capture system comprises floor sensors provided within the first zone and the second zone that provide feedback data indicative of the location of the user within the actual space of the environment, and wherein the evaluation criteria comprises information corresponding to the feedback data.

20. The system of claim 12, wherein the motion capture system comprises at least one motion capture camera that detects when a user is located within the first zone or the second zone and that provides feedback data indicative of the location of the user within the actual space of the environment, and wherein the evaluation criteria comprises information corresponding to the feedback data.

21. A system for triggering movement of a user in a virtual immersive environment, the system comprising:
- a motion capture system that determines a first location of the user within an actual space of the environment, wherein the actual space of the environment includes a plurality of concentric zones centered about a center point of the actual space of the environment, the plurality of concentric zones includes a first zone and a second zone, the first zone includes the center point and is defined by an outer boundary, the second zone surrounds the first zone and is defined by an inner boundary and an outer boundary, wherein the outer boundary of the first zone coincides with the inner boundary of the second zone, wherein the first location is within a first zone, the motion capture system also determines a second location of the user within the actual space of the environment, and wherein the second location is within the second zone;
- a sensory interface that receives evaluation criteria derived from the motion capture system, wherein the evaluation criteria is used to trigger movement of the user within a virtual world when the user moves from the first zone to the second zone, the sensory interface generates sensory messages corresponding to the evaluation criteria, and movement of the user within the virtual world is at a constant speed when the user is located in the second zone; and
- a sensory output system that receives the sensory messages which instruct the sensory output system to create sensory effects.

* * * * *